(12) United States Patent
Madgavkar et al.

(10) Patent No.: US 10,143,148 B2
(45) Date of Patent: Dec. 4, 2018

(54) METHODS AND DEVICES FOR ASSESSING A FIELD OF PLANTS FOR IRRIGATION

(71) Applicant: CERES IMAGING INC., Oakland, CA (US)

(72) Inventors: Ashwin Madgavkar, Katy, TX (US); James McBride, Berkeley, CA (US); Dan Urban, Palo Alto, CA (US); Robert Heilmayr, Piedmont, CA (US)

(73) Assignee: CERES IMAGING INC., Oakland, CA (US)

( * ) Notice: Subject to any disclaimer, the term of this patent is extended or adjusted under 35 U.S.C. 154(b) by 267 days.

(21) Appl. No.: 15/154,926

(22) Filed: May 13, 2016

(65) Prior Publication Data

US 2017/0325418 A1    Nov. 16, 2017

(51) Int. Cl.
  *A01G 25/16* (2006.01)
  *G05D 7/00* (2006.01)
  *G05D 7/06* (2006.01)

(52) U.S. Cl.
  CPC .......... *A01G 25/16* (2013.01); *G05D 7/0676* (2013.01)

(58) Field of Classification Search
  CPC .... A01G 25/16; A01G 25/167; A01G 25/165; G05B 2219/2625; G05B 19/042
  See application file for complete search history.

(56) References Cited

U.S. PATENT DOCUMENTS

| | | | | |
|---|---|---|---|---|
| 5,549,729 | A * | 8/1996 | Yamashita | A01C 1/06 71/11 |
| 5,764,819 | A * | 6/1998 | Orr | A01G 7/00 348/144 |
| 8,924,031 | B1 * | 12/2014 | Evett | A01G 25/16 700/284 |
| 9,107,354 | B2 * | 8/2015 | Martin | A01G 25/167 |
| 2002/0008167 | A1 * | 1/2002 | Haberland | A01G 25/167 239/722 |
| 2002/0121046 | A1 * | 9/2002 | Yamashita | A01G 7/06 47/58.1 SC |
| 2014/0035752 | A1 * | 2/2014 | Johnson | A01G 22/00 340/601 |
| 2014/0208648 | A1 * | 7/2014 | Cox | A01G 9/02 47/66.7 |
| 2017/0268192 | A1 * | 9/2017 | Biley | E02B 15/106 |
| 2017/0311559 | A1 * | 11/2017 | Ebert | A01G 22/00 |
| 2017/0325418 | A1 * | 11/2017 | Madgavkar | G05D 7/0676 |
| 2018/0020622 | A1 * | 1/2018 | Richt | G06F 17/5009 703/6 |

* cited by examiner

*Primary Examiner* — Ronald D Hartman, Jr.
(74) *Attorney, Agent, or Firm* — American Patent Agency PC; Daniar Hussain; Xiaomeng Shi

(57) ABSTRACT

A method of estimating a water property value for plants using aerial thermal images is provided. The thermal image values and at least one weather parameter are used to calculate a water stress value. The water property value is estimated using the water stress value and a predetermined correlation between the water stress value and the water property value.

42 Claims, 6 Drawing Sheets

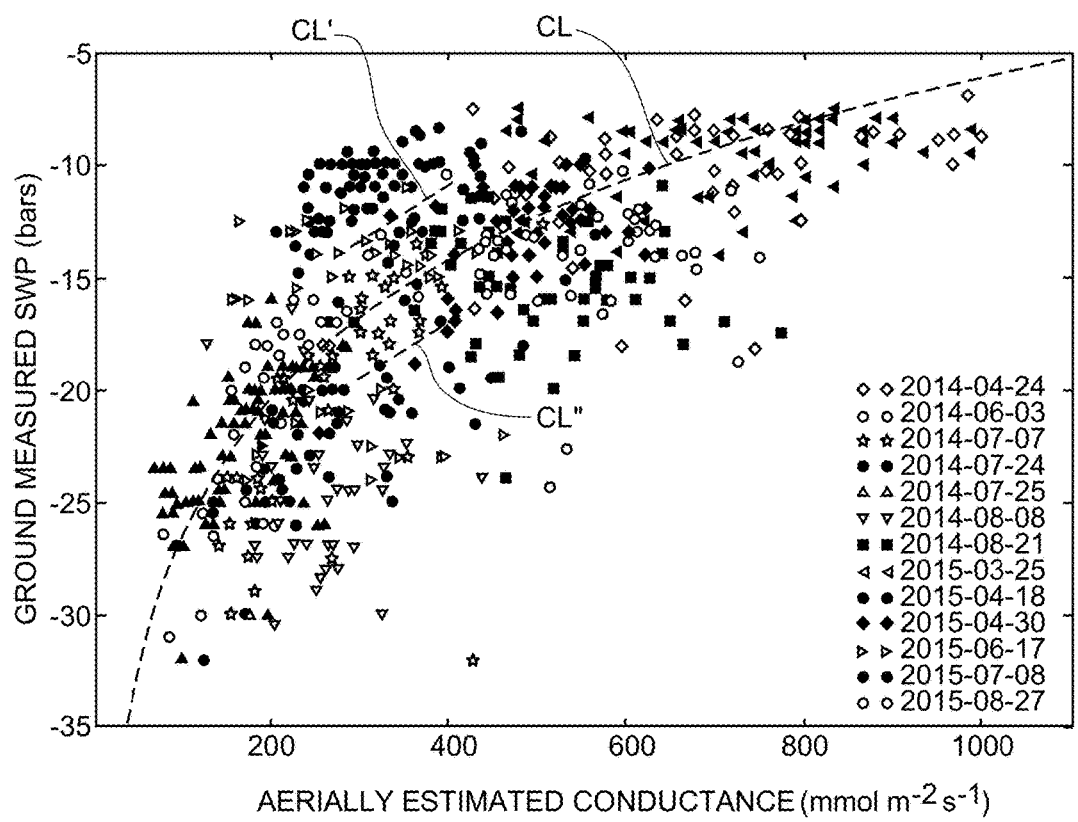

FIG. 5

$$g_\ell = \frac{1}{r_W - r_{aW}} \quad (1)$$

$$r_W = \frac{\rho_a c_p r_{HR}}{\gamma} \left( \frac{s(T_\ell - T_a) + D}{r_{HR} R_{ni} - \rho_a c_p (T_\ell - T_a)} \right) \quad (2)$$

$$D = v p_{sat} \left( 1 - \frac{RH}{100} \right) \quad (3)$$

$$R_{ni} \simeq R_n - g_R \rho_a c_p (T_\ell - T_a) \quad (4)$$

$$g_R \equiv \frac{4 \varepsilon \sigma T_a^3}{\rho_a c_p} \quad (5)$$

$$g_{aW} \simeq g_{aH} = c \left( \frac{u}{d} \right)^{0.5} \quad (6)$$

$$g_{HR} = g_{aW} + g_R = r_{HR}^{-1} \quad (7)$$

$g_\ell$ = stomatal conductance
$r_W$ = resistance to water vapor
$r_{aW}$ = boundary layer resistance to water vapor
$g_{aW}$ = boundary layer conductance to water vapor
$g_R$ = radiative conductance
$r_{HR}$ = parallel heat and radiative transfer resistance
$g_{HR}$ = parallel heat and radiative transfer conductance
$\rho_a$ = density of air
$c_p$ = heat capacity of air
$s$ = rate of change of saturation vapor pressure with temperature
$T_\ell$ = leaf temperature
$T_a$ = air temperature
$D$ = atmospheric vapor pressure deficit
$\gamma$ = psychrometer constant
$R_n$ = net radiation
$R_{ni}$ = isothermal net radiation
$v p_{sat}$ = saturation water vapor pressure
$RH$ = relative humidity, in %
$\varepsilon$ = emissivity
$\sigma$ = Stefan-Boltzmann constant
$u$ = wind speed
$c$ = leaf shape dependent heat transfer parameter
$d$ = characteristic size of leaf $$\text{CWSI} = \frac{(T_\ell - T_a) - T_{\text{baseline}}}{T_{\text{max}} - T_{\text{baseline}}} \qquad (1)$$

$T_{\text{baseline}}$ = crop-specific non-water-stress-baseline, which depends upon vapor pressure deficit
$T_{\text{max}}$ = crop-specific maximum stress

METHODS AND DEVICES FOR ASSESSING A FIELD OF PLANTS FOR IRRIGATION

BACKGROUND OF THE INVENTION

Irrigation management plays a critical role in precision farming and maximizing yield productivity. Insufficient irrigation reduces crop productivity, but excessive irrigation imposes a large burden on the water supply of regions affected by agricultural production, especially those that are drought sensitive. Efficient allocation of water is therefore a matter of high social and environmental importance.

Water allocation can be made more efficient by providing more extensive intra-field knowledge of crop water stress. Typical practice for scheduling irrigation in agricultural fields involves assessing the water stress status of plants in the field using time intensive direct measurements from the plants, and scheduling irrigation when plant water stress exceeds some threshold. One such direct measure of water stress is stem water potential (SWP). The procedure for measuring SWP involves determining the vacuum pressure required to squeeze water out of an incision in a leaf stem. SWP provides an accurate measure of water status for an individual plant, but only a tiny fraction of a large field can be tested in a given day, due to the time and effort involved in making SWP measurements.

Such data can enable growers to irrigate the portions of their field having the greatest need for water, while applying significantly less water to unstressed portions. This stands in contrast to many current irrigation practices, which apply a large amount of water over an entire field, and consequently over-irrigate large sections of unstressed crops. A problem with the conventional method is that growers are able to directly measure water stress on only a small subsample of their fields.

Presently, plant water status measurements are typically made by a skilled agronomist using specialized equipment. Such on-the-ground, direct plant water status measurements are time consuming and labor intensive. Stem water potential (SWP), for example, requires careful application of a dedicated apparatus to a particular leaf stem during a limited range of mid-day hours when measurements are most sensitive to water stress (during the peak of evaporative demand). Even a sizable team of testers, therefore, can take SWP measurements on only a small fraction of trees in orchards whose total tree count can number in the tens of thousands. It is therefore infeasible to obtain SWP values for more than a very small fraction of the total number of trees.

Measurements from thermal long-wave infrared (8 μm to 14 μm) have been studied in academic work for over 30 years, and demonstrated as a potentially powerful tool to determine water stress in crops. However, there has been limited use of aerial thermal imagery for irrigation scheduling in commercial settings. Two shortcomings of the results from existing academic work as applied in commercial settings are 1) academic using thermal imagery are not provided in terms that are familiar to growers, and 2) that proper interpretation of thermal imagery also requires accurate, localized weather data, which typically means expensive in-field weather stations.

SUMMARY OF THE INVENTION

The present invention is directed to methods and systems for assessing a field of plants for irrigation. Proper irrigation not only induces optimal growth but also conserves water which is an issue of increasing importance for farmers and their communities. The primary users of this data are agricultural growers, who are able to receive real time estimates of plant-by-plant water status for their entire fields, which they can use to schedule irrigation. Advisors to growers, including agronomists, fertilizer retailers, and farm management and consulting companies, are also able to use this invention.

In practice, aerial high resolution thermal imagery is used to measure crop foliage temperature. The same aircraft may also collect one or more weather measurements such as during a separate lower elevation pass over the field. This data is then used to calculate a water stress value in the field and, in one aspect, for each plant in the field. Water property values are then estimated for the plants in the field using the water stress values and a correlation between the water stress value and the water property value. The present invention provides an estimate of the water property value for thousands of plants in a field from data collected remotely by an aircraft. In one aspect, the predetermined correlation may be from a known correlation (same or similar plants) or from an empirical study. In another aspect, the water property value may be estimated for each plant in the field providing obvious advantages over methods providing more general data.

The present invention addresses some of the limitations of the prior art by providing an explicit pathway from aerial thermal imagery to an estimate of a familiar ground based water property value related to a direct measurement such as stem water potential. Our method of leveraging high resolution aerial thermal imagery to estimate plant stress has the advantage of obtaining estimates of the water property (such as SWP) potentially for every plant in a field, thereby providing a more powerful tool for irrigation scheduling. Thus, the method provides a high spatial resolution assessment of crop water status derived from aerial imagery in terms of a well-known water property value such as SWP.

In another aspect, the present invention provides advantages over prior art methods in that no on-the-ground presence is required. Weather data may also be collected aerially, using a low altitude pass over the field immediately prior to or after imagery acquisition. A boundary layer profile model may be used to estimate the in-field weather data from the aerial measurements. Since the weather values are obtained very near the field, even a rough model can produce acceptable errors in measurements of near canopy weather conditions. The low altitude pass may occur at an altitude no more than 200 meters. The estimates of near canopy weather conditions are then used with the foliage temperatures measured from the thermal imagery to generate water stress values for the entire field.

The present invention provides a method of estimating the water property value (such as SWP) for potentially every plant in a field from an aerial thermal image, as though each plant were individually tested using the conventional ground-based technique. This invention facilitates more precise irrigation scheduling in large agricultural fields by estimating water status at high spatial resolution in a single day, a previous impossibility given the time- and labor-intensiveness of in-field water status measurements.

The present invention is also directed to a system for assessing a field of plants for irrigation.

These and other aspects of the invention will become apparent from the following description of the preferred embodiments, drawings and claims.

BRIEF DESCRIPTION OF THE DRAWINGS

FIG. 4 shows prior data for a field over several months and a correlation line between the water property value and the water stress value.

FIG. 5 shows equations for calculating a stomatal conductance.

DESCRIPTION OF THE PREFERRED EMBODIMENTS

The present invention is directed to methods and systems for assessing a field of plants 4 for irrigation. A thermal map 2 (see FIG. 1) of a field having a plurality of plants 4 thereon is assessed in the following manner to assist in selecting appropriate irrigation for each part of the field and potentially for each plant. Proper irrigation is particularly useful and beneficial in not only providing optimal irrigation for plant growth but also conserves water which is an issue of increasing importance to farmers and agricultural communities. The term "field" and "plant" as used herein are generic to any field, orchard, patch or other cultivated land and any type of plant growing thereon.

Figure 1:
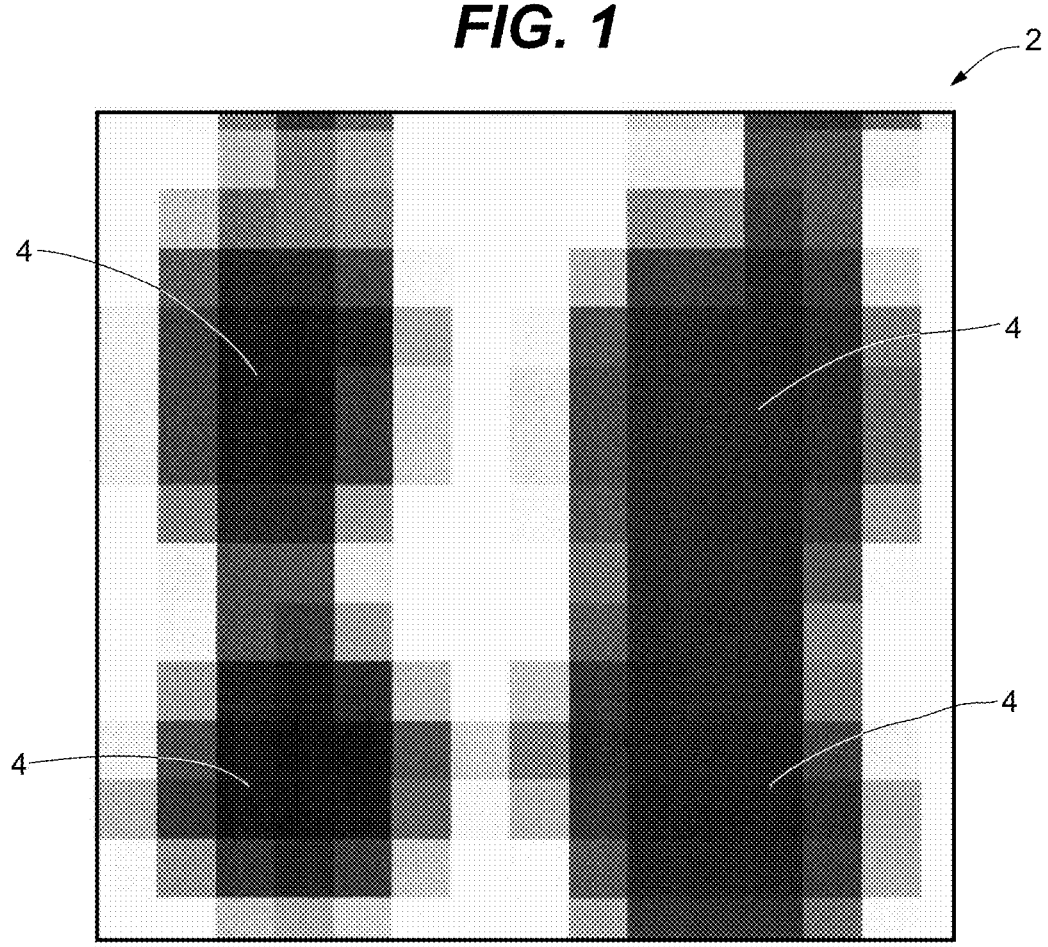
FIG. 1 shows a partial thermal image of a field.

The thermal map 2 (as used and defined herein) may be derived from at least one thermal image taken by an aircraft and may be a mosaic of a plurality of thermal images taken by the aircraft. FIG. 1 shows a very small portion of one such thermal map in grey scale showing just four plants 4 in the field for clarity. Extracting or deriving a single temperature for each plant 4 may be accomplished in any suitable manner. As explained below, the present invention may be used to individually evaluate the water status of at least one thousand plants in the field and may be used to evaluate thousands of plants in the same field. The aircraft may be manned or unmanned with the unmanned controlled by a ground-based operator or flying autonomously along a programmed flight path. The thermal images are mosaicked into a single thermal map or image 2 in any suitable manner. The thermal map 2 provides a thermal value for a plurality of geographically referenced locations in the field. The geographically referenced locations may be referenced relative to any suitable reference frame including global coordinates or to a field-specific local reference frame or plant identifier. The term thermal image or thermal map as used herein does not necessarily require or imply a 2-dimensional representation and refers simply to data having a referenced position and a value associated with that position thereby containing the information of a two dimensional map without requiring the actual two dimensional representation.

Aerial thermal imagery is obtained using a thermal camera mounted on a manned or unmanned aerial vehicle preferably over a short period of time near mid-day although any suitable method may be used without departing from various aspects of the invention. The thermal images should be acquired over as short a period as possible so that environmental conditions do not significantly change between the beginning and end of a data-acquisition flight. To minimize flight time while covering typical agricultural areas, the flight altitude should be at least 200 meters. For accurately extracting aerial measurements at the locations of ground samples, individual images are mosaicked, and the mosaic is georegistered and orthorectified.

The recorded digital numbers of each pixel in the thermal images are converted to temperature based on camera calibration coefficients. The resulting image provides a spatial map of temperature across the entire field of interest.

Figure 2:
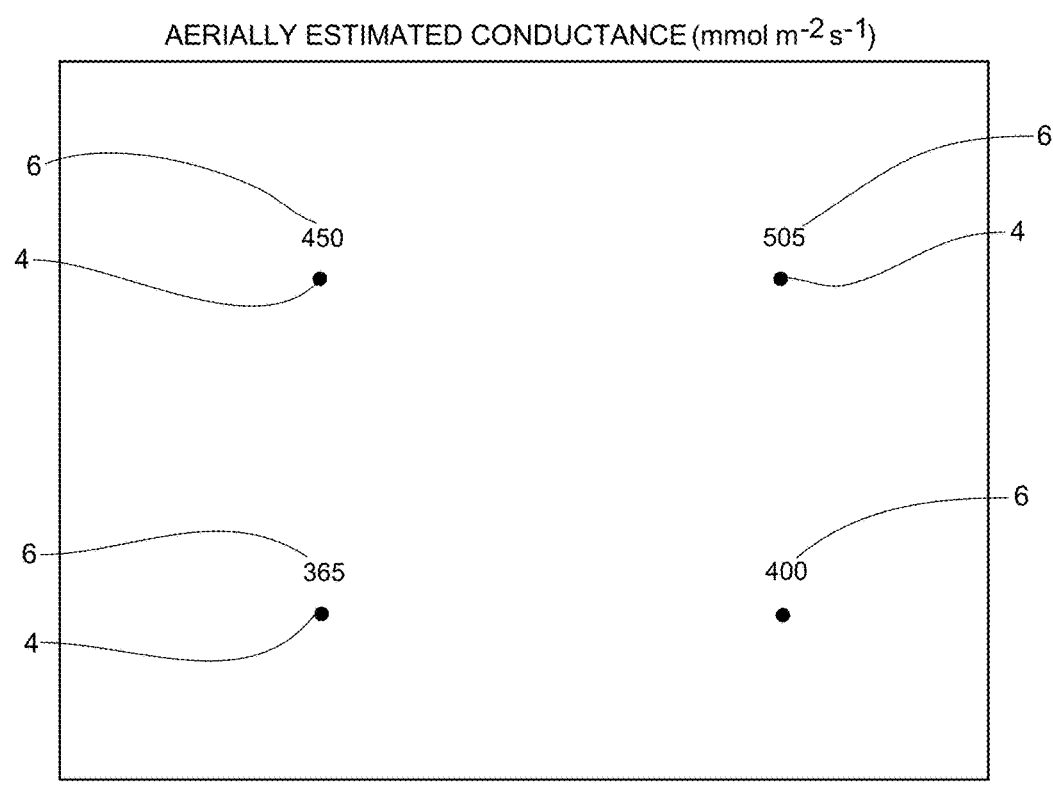
FIG. 2 shows a map of four water stress values calculated from the thermal image of FIG. 1.

Then, using the weather conditions in the field, the aerially measured temperature values in the final image are converted into a water stress value 6 as shown in FIG. 2, such as the crop water stress index (CWSI), stomatal conductance or other suitable indicator as explained further below. The method herein calculates the crop stress value 6 using the foliage temperature, air temperature, humidity, wind speed and net radiation, unlike the traditional CWSI, which includes only foliage temperature, air temperature, and humidity. The weather parameter may be a radiation value and/or a wind speed and may include at least air temperature, humidity, wind speed and radiation. In still another aspect of the present invention, the weather parameters used to calculate the water stress value 6 do not include any ground measurements of any weather parameter. In a further aspect, the weather parameter is also collected by the same aircraft taking the thermal images. The aircraft may measure the weather parameter(s) during a pass over the field at a lower elevation than when taking the thermal image(s) (but may be above 200 meters in altitude) and on the same day as the thermal image was derived. Of course, ground based weather measurements may be used without departing from numerous aspects of the present invention.

The water stress value 6 may also be calculated using plant specific parameters and can also incorporate more crop-specific parameterization and basic physiological principles to compute a quantity such as stomatal conductance. For stomatal conductance, these parameters include boundary layer conductance of the leaf and stomatal morphology (amphistomatous or hypostomatous). For example, a first plant specific parameter may be related to leaf shape and a second plant specific parameter may be related to leaf size as explained below.

Figure 3:
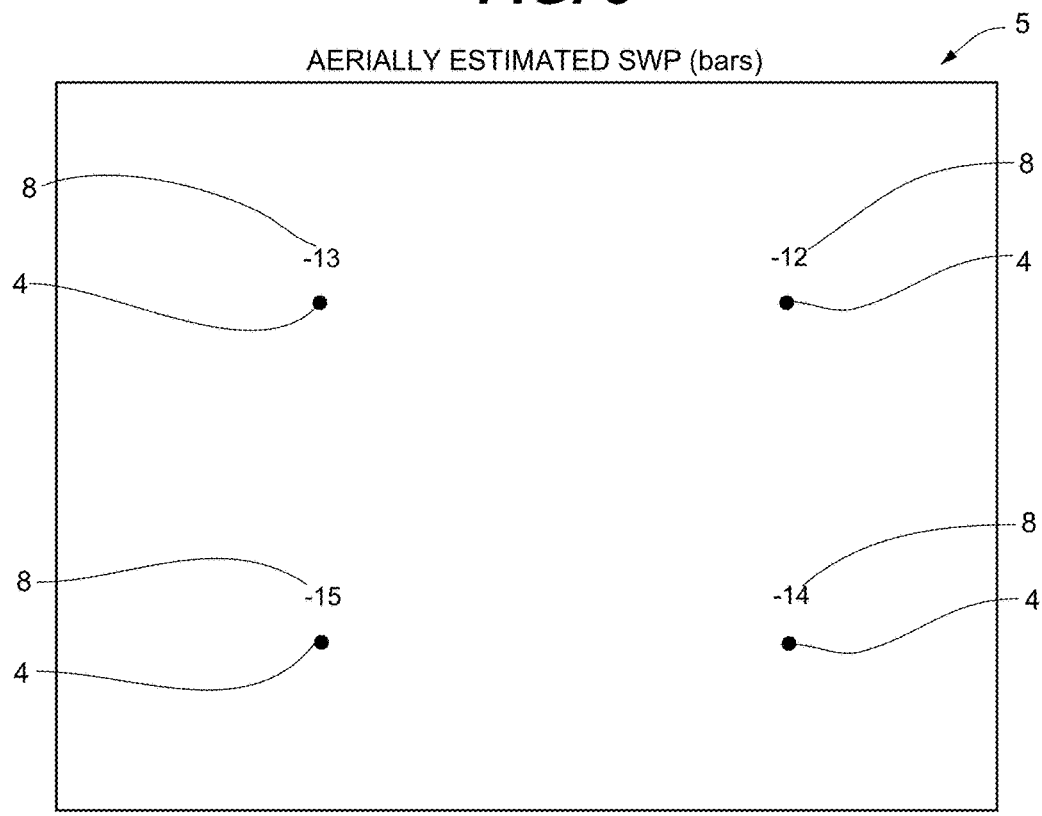
FIG. 3 shows a map of water property values estimated from a predetermined correlation with the calculated water stress values of FIG. 2 which is used to assist in irrigation.

Referring to FIG. 3, a water property value 8 for each location, or even plant 4, is then estimated by using the calculated water stress value 6 and a predetermined correlation between the water stress value 6 and the water property value 8. The predetermined correlation may be from a known correlation for the same or similar plants or from an empirical study with the same field as described herein. Referring to FIG. 4, a correlation line CL is shown which may be derived from an empirical study as described below.

The water property values 8 may be geographically mapped to aid in planning and carrying out irrigation of the field as shown in the map 5 of FIG. 3. The water property value 8 may be estimated for each plant 4 in the field which provides obvious advantages over methods which provide more generalized information about the field rather than individual, plant specific information. Of course, the present invention may provide geographic data which is more general rather than specific to each plant without departing from various aspects of the present invention.

The predetermined correlation of FIG. 4 may be a known correlation for the same or similar plants or an empirical relationship determined from previously collected data for the field as now described and shown in FIG. 4. First, direct measurements of the plants (in the conventional manner) are collected for the water property value to be modeled. Sampling should be done at a variety of locations within the field, to provide as representative a census of the field conditions as possible. Precise locations of plants for which ground measurements of water property status are obtained are recorded so that imagery-derived thermal values can then be extracted at the locations of the ground samples. Local weather data, minimally including air temperature, humidity, and net radiation, is collected with ground and/or aerial measurements. The model should incorporate data from throughout the crop growing season, as the crop transitions through different physiological states. That the model incorporate data throughout the growing season is critical to the success of the model during the application phase, when no ground based data is collected. In this, the inclusion of net radiation in calculating of the crop stress value is important; like air temperature, net radiation changes significantly through the growing season, and foliage temperature is sensitive to net radiation. The correlation may also include a time dependent and/or growth stage dependent aspect as explained below.

A thermal map provides thermal values corresponding to each direct measurement to be used in the empirical determination of the correlation. A water stress value is calculated using the thermal value and one or more weather parameters as described herein for each plant for which a direct measurement of water status was taken. Weather measurements may be aerial (same aircraft at a different altitude as described herein) or ground based. The empirical study of a field may, of course, take place without aerial imaging and/or weather measurements without departing from the present invention.

FIG. 4 shows a plot of the direct measurements of the water property value, in this case stem water potential, and the calculated water stress value, in this case stomatal conductance, for a field at various times during a season. The empirical relationship includes measurements for a number of plants each day data was collected and the data was collected on various days over several months for a field of almond trees.

The data is curve-fit to provide the correlation line CL in any suitable manner. The correlation line CL is then used to estimate the water property values in the future from aerial thermal imagery and weather data alone. In this manner, the water property value, such as stem water potential, may be estimated for the field, and potentially for each plant or tree in the field, using aerial thermal images and aerially collected weather data. The correlation line CL may also include a time dependent aspect such as the particular month or week of the year. The correlation line CL may also be growth stage dependent. For example, the correlation line CL may include a segment CL' and a segment CL" which are time or growth stage dependent. The segment CL' could be used during early months (or early growth stages) while CL" is used during the late months (or late growth stages). The time dependent or growth stage dependent relationships may become apparent when the empirical methods of determining the correlation are used as described herein. Of course, numerous aspects of the present invention may be practiced without a time or growth stage dependent correlation between the water stress and water property values. The time or growth dependent aspects CL', CL" may also be along selective portions of the correlation line CL as shown.

Once the water property values 8 are estimated using the predetermined correlation (whether empirically based or otherwise), the field may then be irrigated in accordance with the map of the water property values 8 (see FIG. 3). As mentioned above, the map 5 of FIG. 3 may include a water property value for each plant 4 in the field. For sake of clarity, a two dimensional representation of the map 5 of the water property values for the four trees of FIG. 1 is shown in FIG. 3. Of course, the present invention is useful in producing a map having a thousand plants or more and FIG. 3 shows only four plants for clarity. As can be appreciated, the ability to estimate the water property without requiring direct measurement (such as stem water potential) provides great advantages and labor savings over the conventional method. A field having thousands of plants can be evaluated using aerial thermal imagery and without any direct measurements required.

The water stress value may be a stomatal conductance or crop water stress index as now specifically described. Stomatal conductance is calculated using the equations shown in FIG. 5 and crop water stress index may be calculated using the equations of FIG. 6. Although the present invention may be practiced by calculating any appropriate crop stress value, stomatal conductance takes into account some weather parameters, such as radiation and wind speed, which may improve accuracy over methods which do not. Furthermore, the stomatal conductance also provides crop specific parameters, such as the shape dependent heat transfer parameter (c) and the characteristic leaf size (d) which depend on the type of plant. The crop specific parameter may also be independent of any weather parameter. Of course, methods which calculate crop water stress index using a humidity dependent baseline temperature may still be used in accordance with numerous aspects of the present invention.

As for the calculation of stomatal conductance, the contribution of plant specific parameters (c) and (d) modify the magnitude of the wind speed and radiation contributions, respectively, in calculating the water stress value. Stated another way, the plant specific parameters (c) and (d) contribute to calculating the boundary layer conductance/resistance to water vapor and the parallel heat and the parallel heat and radiative transfer conductance/resistance, respectively. The parallel heat and radiative transfer conductance/resistance are then used to calculate the resistance to water vapor. The crop specific parameter (c) is dependent upon leaf shape while parameter (d) is dependent upon leaf size.

Figures 6, 7:
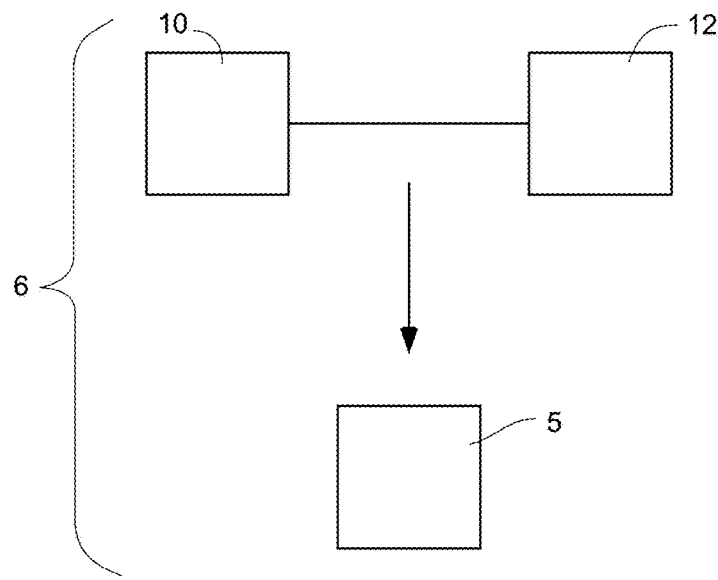
FIG. 6 shows equations for calculating a crop water stress index.
FIG. 7 shows a system with a processor and a data storage element used to calculate the water stress value, estimate the water property value and provide the map of water property values for irrigation of the field.

The present invention is also directed to a system 6 for assessing a field of plants for irrigation as shown in FIG. 7. A data storage element 10 stores the thermal map and the thermal value for each location. The data storage 10 may store a plurality of thermal images which a processor 12 combines by mosaicking the images into the thermal map. The data storage element 10 also stores one or more weather parameters as described above.

The processor 12 calculates the water stress value for each location using the weather parameter and the thermal value. The processor 12 also estimates a water property value for each location using the water stress value and the predetermined correlation.

The processor 12 may form the map 5 (FIG. 3) of the water property value for various locations in the field. The irrigation system is then operated in accordance with the map 5 to optimize irrigation. As can be appreciated, the processor 12 may be a number of processors, rather than a single processor, which perform different steps without departing from the scope of the invention. For example, a processor may be used to mosaic the thermal images while another processor calculates the water stress value and/or estimates the water property value without departing from the scope of the invention. Similarly, the data storage element 10 may also contain separate storage elements for storing different aspects (such as one element storing weather data and another storing the thermal image data) without departing from the scope of the invention.

We conclude we are able to provide reliable estimates of water status in terms of a widely used ground-based water property value (such as SWP) for each individual tree within a field (which may be an orchard or any other cultivated land as used herein) for any given day on which aerial thermal imagery and weather data are acquired. As ground measurements can only be realistically obtained for tens, or perhaps hundreds, of plants for fields that typically contain tens of thousands of plants, our method provides roughly three orders of magnitude more measurements of plant water status than the existing method. This is a dramatic improvement that allows more precise and high resolution irrigation decision making than the current practice. Once a crop model has been developed, our method requires no on the ground presence, a significant improvement over methods requiring ground based weather or plant measurements.

The present invention has been described with reference to preferred embodiments. Of course, modification of the methods described herein may be incorporated without departing from the invention. For example, the water stress value may be calculated in any other suitable manner so long as the data is computed, derived or otherwise manipulated in accordance with the principles of the invention. The water stress value may, in fact, be not a generally recognized value within the art so long as the correlation is appropriately formed and the resulting water property value is a recognized value when making irrigation decisions. Further, various weather data may be collected from ground measurements without departing from aspects of the invention.

What is claimed is:

1. A method of assessing a field of plants for irrigation, comprising the steps of:
   acquiring at least one thermal image of a field having a plurality of plants thereon utilizing one or more thermal cameras;
   generating a thermal map of the field from the thermal image utilizing a hardware processor, the thermal map providing a thermal value for a plurality of geographically referenced locations in the field;
   measuring at least one weather parameter for the field utilizing one or more weather sensors;
   calculating a water stress value for each of the plurality of locations using the weather parameter and the thermal value for each of the plurality of locations in the field;
   estimating a water property value for each of the plurality of locations using the water stress value from the calculating step and a predetermined correlation of the water stress value and the water property value; and
   planning and carrying out irrigation of the field in accordance with the water property value from the estimating step.

2. The method of claim 1, wherein:
the estimating step is carried out with the water property value being estimated for each plant in the field.

3. The method of claim 1, wherein:
the acquiring step is carried out with the at least one thermal image taken by an aircraft.

4. The method of claim 3, wherein:
the measuring step is carried out using the aircraft.

5. The method of claim 4, wherein:
the measuring step is carried out with the aircraft during a pass over the field at a lower elevation than the thermal image derived from the acquiring step and on the same day as the thermal map was derived.

6. The method of claim 3, wherein:
the acquiring step is carried out with the aircraft at an altitude of greater than 200 meters; and
the measuring step is carried out with the aircraft at an altitude of less than 200 meters.

7. The method of claim 1, wherein:
the measuring step is carried out without ground measurements of the weather parameter.

8. The method of claim 1, wherein:
the calculating step is carried out with the water stress value being a crop water stress index.

9. The method of claim 1, wherein:
the calculating step is carried out with the water stress value being a stomatal conductance.

10. The method of claim 1, wherein:
the calculating step is carried out without any ground measurements of any weather parameter used in the calculating step.

11. The method of claim 1, wherein:
the estimating step is carried out with the predetermined correlation being a correlation formed from previously collected data for the field, the previously collected data including a direct measurement of a prior water property value in the field and a prior calculated water stress value for each of a plurality of plants in the field.

12. The method of claim 11, wherein:
the estimating step is carried out with the previously collected data being collected in a prior season for the field.

13. The method of claim 11, wherein:
the estimating step is carried out with the previously collected data including a prior thermal map of the field and a prior weather parameter which are used to calculate the prior calculated water stress value.

14. The method of claim 11, wherein:
the estimating step is carried out with the predetermined correlation being formed with the previously collected data including data for each month over at least three continuous months of a prior season for the field.

15. The method of claim 11, wherein:
the estimating step is carried out with the direct measurement of the prior water property value being a stem water potential for each of the plurality of plants in the field.

16. The method of claim 11, wherein:
the estimating step is carried out with the prior calculated water stress value for the previously collected data being a stomatal conductance.

17. The method of claim 11, wherein:
the estimating step is carried out with the prior calculated water stress value for the previously collected data being a crop water stress index.

18. The method of claim 1, wherein:
the measuring step is carried out with the weather parameter being a radiation value; and
the calculating step is carried out with the weather parameter being the radiation value.

19. The method of claim 1, wherein:
the measuring step is carried out with the weather parameter being a wind speed; and
the calculating step is carried out with the weather parameter being the wind speed value.

20. The method of claim 1, wherein:
the measuring step is carried out with the weather parameter being a parameter selected from the group of parameters consisting of air temperature, humidity, radiation and wind speed.

21. The method of claim 1, wherein:
the generating step is carried out with a plurality of thermal images being taken and mosaicked into the thermal map of the field.

22. The method of claim 1, wherein:
the calculating step is carried out using a plurality of weather parameters including at least radiation and wind speed.

23. The method of claim 1, wherein:
the calculating step is carried out using a plurality of weather parameters including at least air temperature, humidity, wind speed and radiation.

24. The method of claim 1, further comprising the step of:
irrigating each plant in the field in accordance with the water property value from the estimating step,
wherein the estimating step is carried out with the water property value being estimated for each plant in the field.

25. The method of claim 1, further comprising the steps of:
forming a map of the water property value for the plurality of geographically referenced locations in the field; and
irrigating the field in accordance with the map.

26. The method of claim 1, wherein:
the calculating step is carried out with the water stress value being calculated using a first crop specific parameter, the crop specific parameter being dependent on the type of plant.

27. The method of claim 26, wherein:
the calculating step is carried out with the first crop specific parameter being not dependent upon any weather parameter.

28. The method of claim 1, wherein:
the calculating step is carried out with the first crop specific parameter being not dependent upon a humidity.

29. The method of claim 26, wherein:
the calculating step is carried out with the first crop specific parameter being dependent upon a leaf shape.

30. The method of claim 26, wherein:
the calculating step is carried out with the first crop specific parameter being dependent upon a leaf size.

31. The method of claim 26, wherein:
the calculating step is carried out with the first crop specific parameter varying a magnitude of wind speed in calculating the water stress value.

32. The method of claim 26, wherein:
the calculating step is carried out with the first crop specific parameter varying a magnitude of net radiation in calculating the water stress value.

33. The method of claim 1, wherein:
the calculating step is carried out with a first crop specific parameter and a second crop specific parameter.

34. The method of claim 33, wherein:
the calculating step is carried out with the first crop specific parameter varying a magnitude of a wind speed and the second crop specific parameter varying a magnitude of net radiation in calculating the water stress value.

35. The method of claim 33, wherein:
the calculating step is carried out with the first crop specific parameter being dependent upon a leaf shape and the second crop specific parameter being dependent upon a leaf size.

36. The method of claim 1, wherein:
the estimating step is carried out with the predetermined correlation being time dependent.

37. The method of claim 1, wherein:
the estimating step is carried out with the predetermined correlation being dependent upon a growth stage of the plant.

38. The method of claim 1, wherein:
the estimating step is carried out with the water property value being estimated for each of at least one thousand plants in the field.

39. A non-transitory storage medium for storing program code for assessing a field of plants for irrigation, the program code executable by a hardware processor, the program code when executed by the hardware processor causing the hardware processor to execute steps to:
receive at least one thermal image of a field having a plurality of plants thereon from one or more thermal cameras;
generate a thermal map of the field from the thermal image, the thermal map providing a thermal value for a plurality of geographically referenced locations in the field;
receive at least one weather parameter for the field from one or more weather sensors;
calculate a water stress value for each of the plurality of locations using the weather parameter and the thermal value for each of the plurality of locations in the field;
estimate a water property value for each of the plurality of locations using the water stress value from the calculating step and a predetermined correlation of the water stress value and the water property value; and
plan and carry out irrigation of the field in accordance with the water property value.

40. A system for assessing a field of plants for irrigation, comprising:
one or more thermal cameras for acquiring at least one thermal image of a field having a plurality of plants thereon;
one or more weather sensors for measuring at least one weather parameter for the field;
a hardware processor; and
a non-transitory storage medium for storing program code thereon, the program code when executed by the hardware processor causing the hardware processor to:
receive the thermal image of the field from the one or more thermal cameras;
generate a thermal map of the field from the thermal image, the thermal map providing a thermal value for a plurality of geographically referenced locations in the field;
receive the weather parameter from the one or more weather sensors;
calculate a water stress value for each of the plurality of locations using the weather parameter and the thermal value for each of the plurality of locations in the field;
estimate a water property value for each of the plurality of locations using the water stress value from the calculating step and a predetermined correlation of the water stress value and the water property value; and plan and carry out irrigation of the field in accordance with the water property value.

41. The system of claim 40, wherein:

the predetermined correlation is a correlation formed from previously collected data for the field, the previously collected data including a direct measurement of a prior water property value in the field and a prior calculated water stress value for each of a plurality of plants in the field.

42. The system of claim 40, wherein:

the weather parameter is measured with an aircraft during a pass over the field at a lower elevation than the thermal image and on the same day as the thermal image was acquired.

* * * * *